United States Patent
Drobot et al.

(10) Patent No.: US 6,290,259 B1
(45) Date of Patent: Sep. 18, 2001

(54) ANTI-ROPING TURNING LOOP

(75) Inventors: Thomas Drobot, Plymouth; William Mar, Clinton Township; Fred Daris, Clarkston; White David, Rochester Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/215,800

(22) Filed: Dec. 18, 1998

(51) Int. Cl.$^7$ .................................................. B60R 22/18
(52) U.S. Cl. ........................ 280/808; 280/801.1; 297/483
(58) Field of Search ............................. 280/801.1, 801.2, 280/808; 297/483, 468, 486

(56) References Cited

U.S. PATENT DOCUMENTS

| | | | |
|---|---|---|---|
| 4,023,826 | * 5/1977 | Kokubo et al. | 297/483 |
| 4,318,552 | * 3/1982 | Seifert et al. | 280/801.1 |
| 5,037,135 | * 8/1991 | Kotikovsky et al. | 280/801.1 |
| 5,257,820 | 11/1993 | Kosugi . | |
| 5,286,057 | * 2/1994 | Forster | 297/483 |
| 5,513,880 | * 5/1996 | Ohira et al. | 297/483 |
| 5,601,311 | * 2/1997 | Pfeiffer et al. | 280/801.1 |
| 5,673,936 | * 10/1997 | Mondel | 297/483 |
| 6,003,951 | * 12/1999 | Hennig et al. | 297/483 |

* cited by examiner

*Primary Examiner*—J. J. Swann
*Assistant Examiner*—Christopher Bottorff
(74) *Attorney, Agent, or Firm*—Mark P. Calcaterra

(57) ABSTRACT

An anti-roping turning loop is provided for a vehicle seatbelt. The turning loop defines a guide slot which is provided with anti-roping projections which prevent twisting of the seatbelt web.

1 Claim, 2 Drawing Sheets

ANTI-ROPING TURNING LOOP

BACKGROUND OF THE INVENTION

Field of the Invention

The present invention relates generally to seatbelt assemblies, and more particularly to an anti-roping turning loop for a seatbelt which is supported on a pillar or the like of a car body and slidably guides the webbing of a seatbelt in a longitudinal direction.

BACKGROUND AND SUMMARY OF THE INVENTION

A seatbelt unit is provided on a seat of a vehicle to restrain the occupants of a vehicle in an emergency such as a vehicle collision. Some seatbelts are provided with a turning loop, which is supported on a pillar of a car body and slidably guides the webbing of the seatbelt in a longitudinal direction. The turning loop helps to properly orient the seatbelt with respect to the vehicle passenger. If the webbing is twisted, the webbing is not only incorrectly adapted to the occupant, but smooth movement of the webbing is also hindered. Therefore, it is desirable to keep the webbing from becoming twisted. In prior designs which are utilized to prevent twisting of the seatbelt webbing, other problems such as binding or tearing of the lateral portion of the webbing may occur. The object of the present invention is to provide a turning loop for a seatbelt, in which the webbing is not twisted and the binding or tearing of the lateral portion of the webbing can be prevented.

These and other objects of the present invention are obtained by providing a turning loop for a seatbelt which is adapted to be mounted on a car body and which includes a guide portion defining a guide slot for receiving a seatbelt therethrough. The guide slot defines a first surface which is adapted to be slidably engaged by the seatbelt and a second surface disposed opposite to and spaced from the first surface. The guide slot terminates at opposite ends into a loop-shaped escape portion and includes a pair of anti-looping projections extending from opposite ends of the second surface adjacent to the loop-shaped escape portions. A distance between the anti-looping projection and the first surface is less than twice a thickness of a seatbelt.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
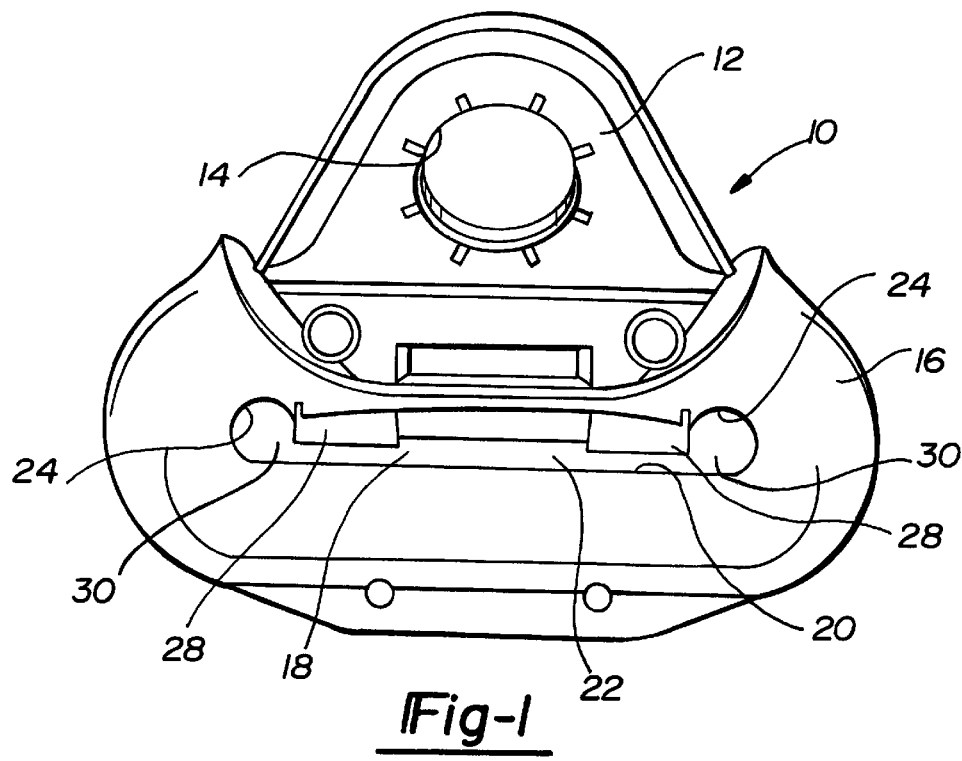
FIG. 1 is front view of the turning loop according to the principles of the present invention.
Figure 3:
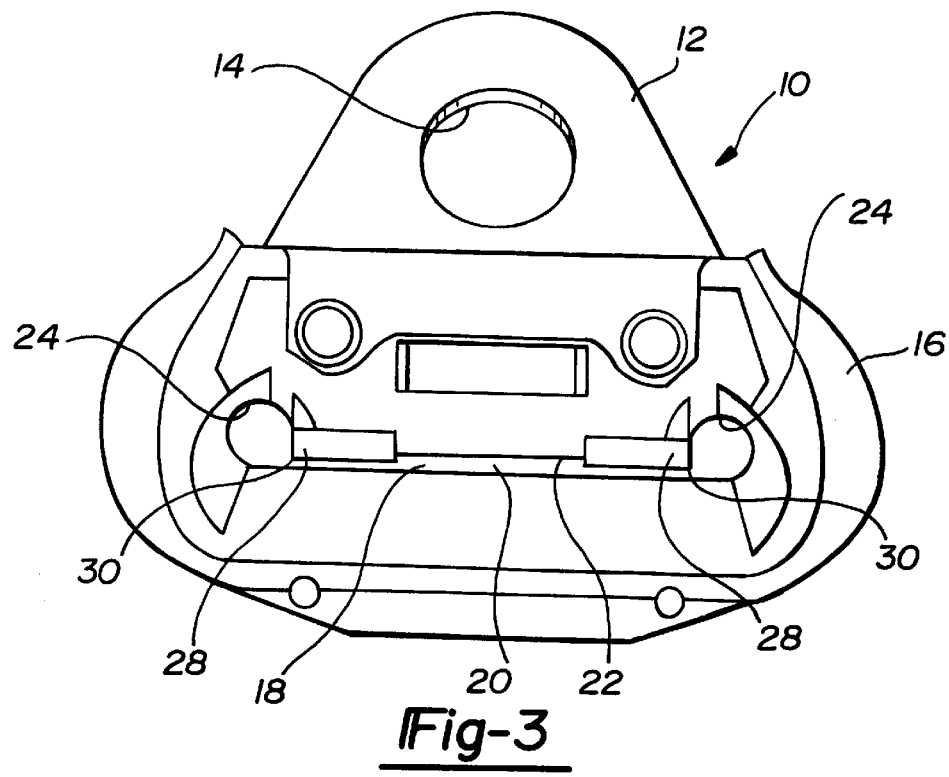
FIG. 3 is a rear view of the turning loop according to the principles of the present invention.

With reference to FIGS. 1–4, the turning loop 10 of the present invention will now be described. The turning loop 10 includes a mounting portion 12 having a mounting hole 14 disposed therethrough for mounting the turning loop 10 to a pillar or the like of a car body, as is known in the art. The turning loop 10 includes a guide portion 16 which defines a guide slot 18 for receiving a web W of a seatbelt. The guide slot 18 is defined by a first surface portion 20 which is designed to be continuously engaged by the seatbelt web W. A second surface 22 is provided opposite to the first surface 20 and along with the first surface 20 defines the guide slot 18. A pair of loop-shaped escape portions 24 are provided on opposite ends of the guide slot 18. The loop-shaped escape portions 24 form a continual curve at each end of the first surface 20. The second surface 22 which is disposed opposite to the first surface 20 is provided with a pair of anti-roping projections 28 which are disposed adjacent to the escape portions 24. The anti-roping projections 28 are each provided with a squared edge 30 on the outboard side of the anti-roping projections 28 adjacent to the escape portions 24. The width of the guide slot 18 at the location between the anti-roping projections 28 and the first surface 20 is less than two times a webbing thickness.

Figure 2:
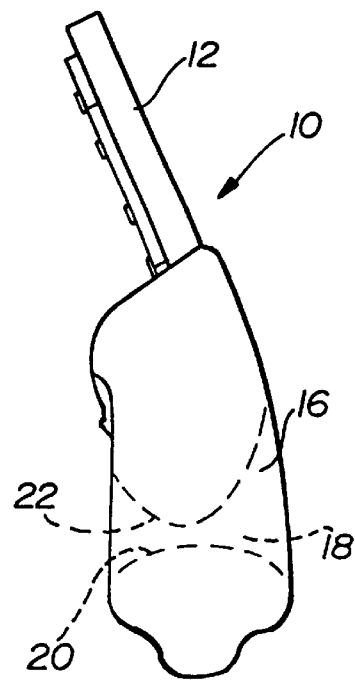
FIG. 2 is a side view of the turning loop according to the principles of the present invention.

The turning loop 10 is preferably made of an engineering plastic material which is reinforced with metal insert molded in the turning loop 10. As seen in FIG. 2, the first and second surfaces 20, 22 are rounded to provide a smooth surface for guiding the seatbelt web W.

Figure 4:
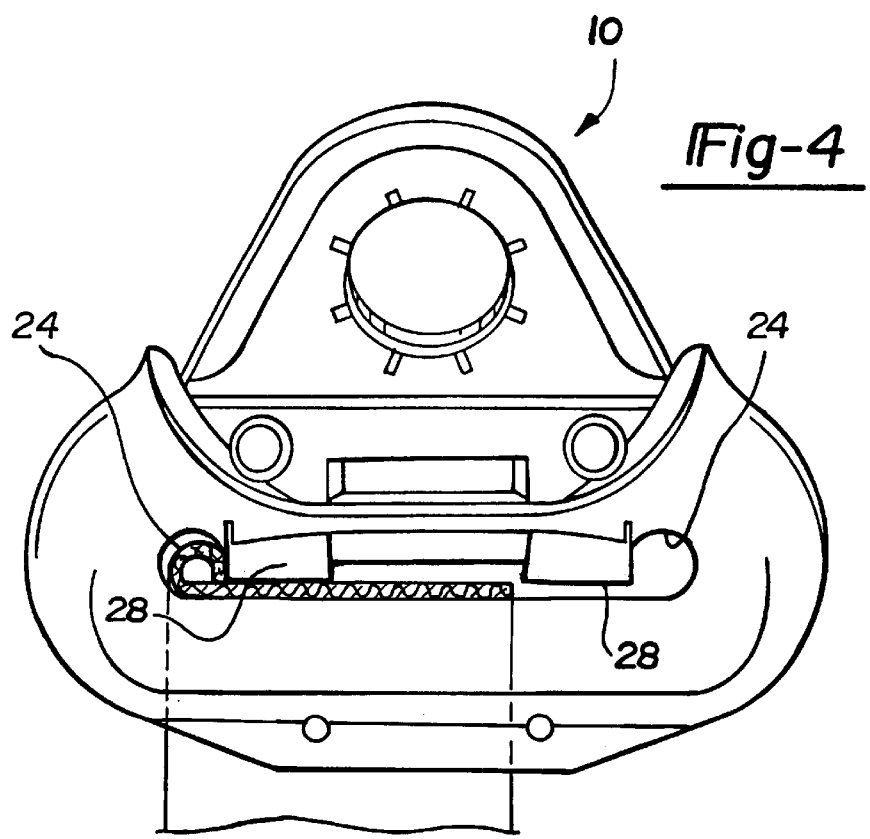
FIG. 4 is a front view of the turning loop according to the present invention illustrating how the seatbelt web is prevented from twisting by the anti-roping projections according to the principles of the present invention.

As shown in FIG. 4, a seatbelt web W is capable of being received within the loop-shaped escape portion 24, but as the lateral edge wraps fully around the loop-shaped escape portion 24, the squared edge 30 of the anti-roping projections 28 prevent the lateral edge of the seatbelt web W from doubling over upon itself. Thus, the problems with twisting or binding of the seatbelt web W are prevented. Furthermore, as the seatbelt web material loops around the loop-shaped escape portion 24, there are no sharp edges for the lateral edges of the webbing material to catch on in order to damage the webbing material. It has been found that it is desirable to have a wider gap in the guide slot 18 in the central location of the guide slot between the anti-roping projections 28, in order to ensure that the travel of the seatbelt web through the turning loop 10 is not hindered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A turning loop for a seat belt, said turning loop adapted to be mounted on a car body, said turning loop comprising:

a guide portion defining a guide slot for receiving a seat belt therethrough, said guide slot being defined by a first surface which is adapted to be slidably engaged by the seat belt and a second surface disposed opposite to and spaced from said first surface, said slot terminating at opposite ends into a loop shaped escape portion and having a pair of anti-roping projections extending from opposite ends of said second surface adjacent to said loop shaped escape portions, wherein a distance between said anti-roping projections and said first surface is greater than a thickness of the seatbelt and less than twice a thickness of the seatbelt, said anti-roping projections having a square edge-surface on an outboard side adjacent to said escape portions, said guide slot having a greater distance between said first surface and said second surface than the distance between said anti-roping projections and said first surface.

* * * * *